(12) United States Patent
Klein

(10) Patent No.: US 7,624,957 B2
(45) Date of Patent: Dec. 1, 2009

(54) MAGNETIC MOUNTING SYSTEM

(75) Inventor: David L. Klein, Shaker Heights, OH (US)

(73) Assignee: Metal & Cable Corp., Inc., Twinsburg, OH (US)

( * ) Notice: Subject to any disclaimer, the term of this patent is extended or adjusted under 35 U.S.C. 154(b) by 547 days.

(21) Appl. No.: 11/196,000

(22) Filed: Aug. 3, 2005

(65) Prior Publication Data

US 2006/0027719 A1 Feb. 9, 2006

Related U.S. Application Data

(60) Provisional application No. 60/598,654, filed on Aug. 4, 2004.

(51) Int. Cl.
*A47G 1/17* (2006.01)
(52) U.S. Cl. ............... 248/206.5; 248/683; 248/519
(58) Field of Classification Search ............ 248/206.5, 248/206.6, 519, 537, 539, 309.4, 581, 610, 248/903, 158, 146, 188.7, 683; 343/878, 343/880, 882, DIG. 1
See application file for complete search history.

(56) References Cited

U.S. PATENT DOCUMENTS

| | | | | |
|---|---|---|---|---|
| 1,319,481 A | * | 10/1919 | Mahon | 248/524 |
| 1,778,481 A | * | 10/1930 | Boucher | 335/219 |
| 3,082,982 A | * | 3/1963 | Moskowitz | 248/537 |
| 4,543,584 A | * | 9/1985 | Leer | 343/881 |
| 5,376,722 A | * | 12/1994 | Coolbaugh et al. | 525/102 |
| 5,979,844 A | * | 11/1999 | Hopkins | 248/158 |
| 2008/0054136 A1 | * | 3/2008 | Gou | 248/205.5 |

FOREIGN PATENT DOCUMENTS

DE 19903819 A1 * 8/2000
WO WO03/047829 A1 * 6/2003

* cited by examiner

*Primary Examiner*—Gwendolyn Baxter
(74) *Attorney, Agent, or Firm*—Fay Sharpe LLP

(57) ABSTRACT

A magnetic mounting system comprises a plurality of magnets and a base. The base includes a plurality of spaced apart mounting apertures. A suspension assembly pivotally secures each magnet of the plurality of magnets to the base. The plurality of mounting apertures of the base allow for varying magnetic arrangements of the plurality of magnets thereby allowing the magnet mounting system to be mounted onto flat surfaces, curved surfaces and/or other shaped surfaces.

18 Claims, 9 Drawing Sheets

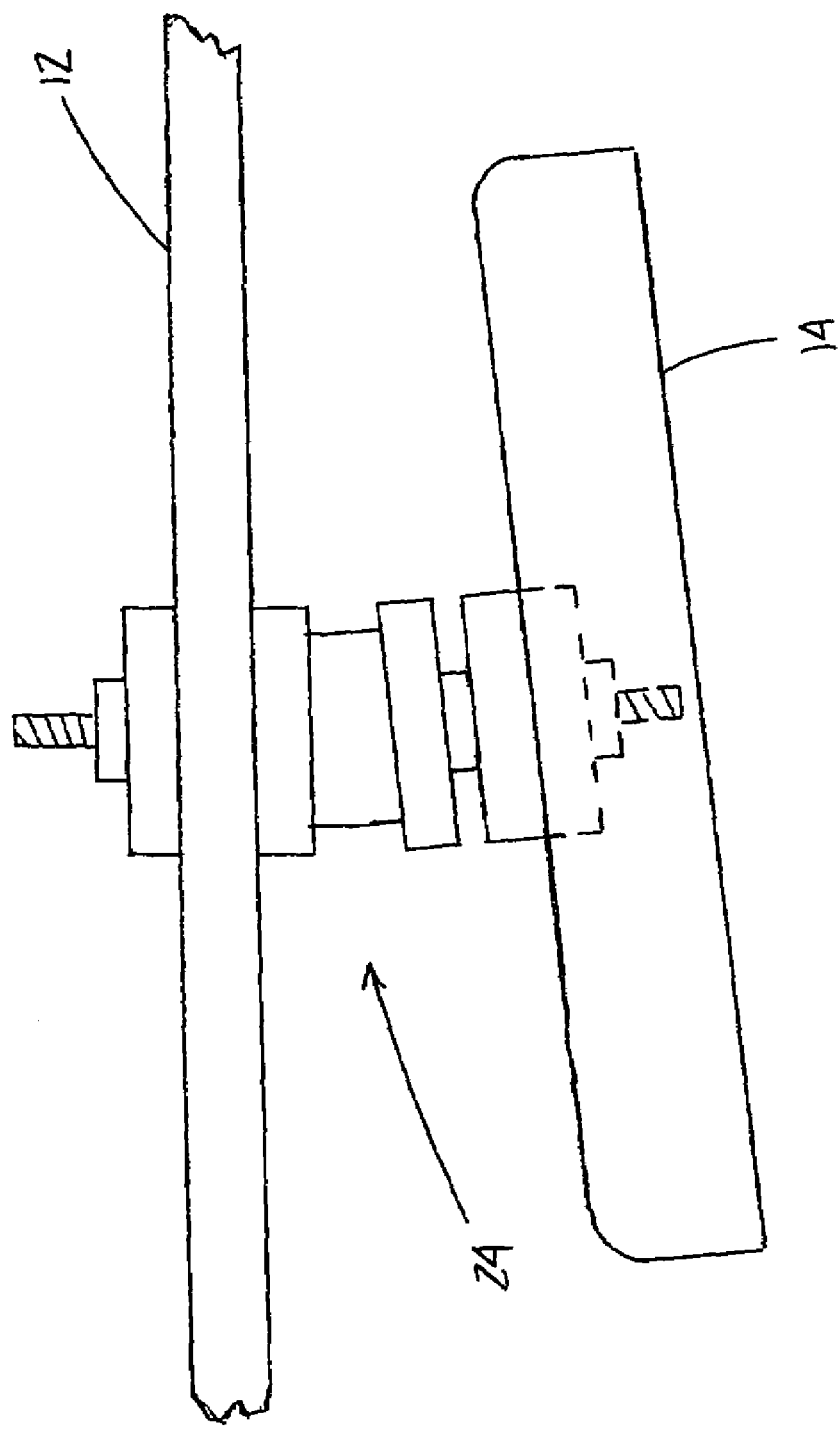

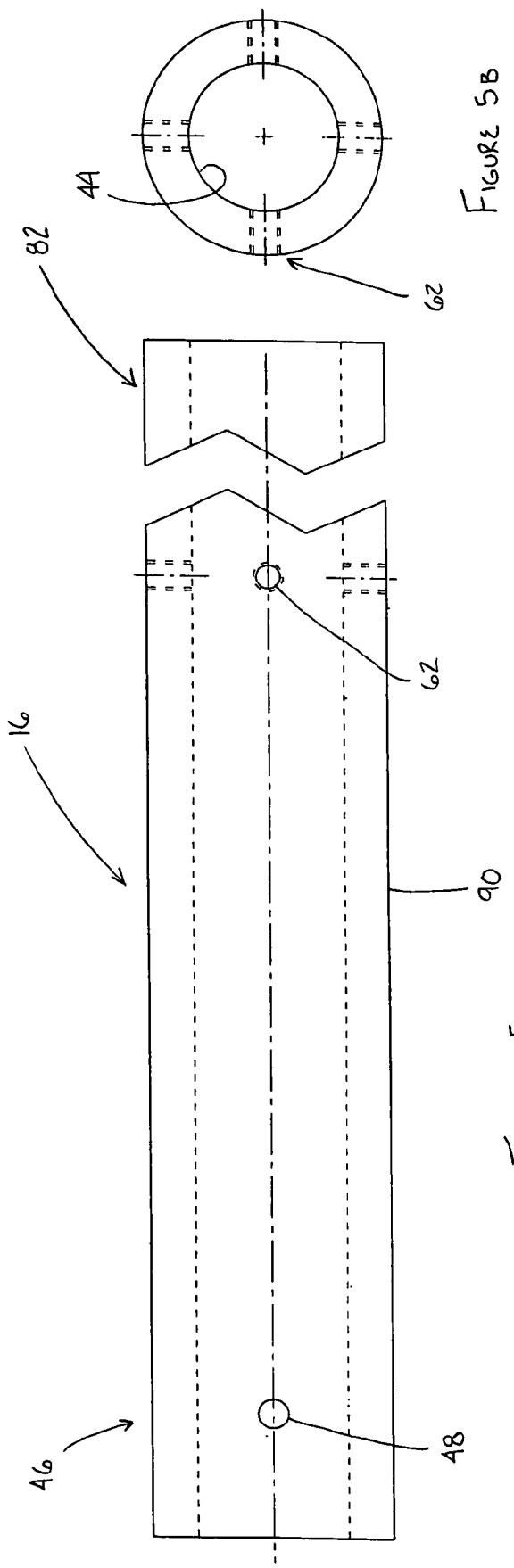

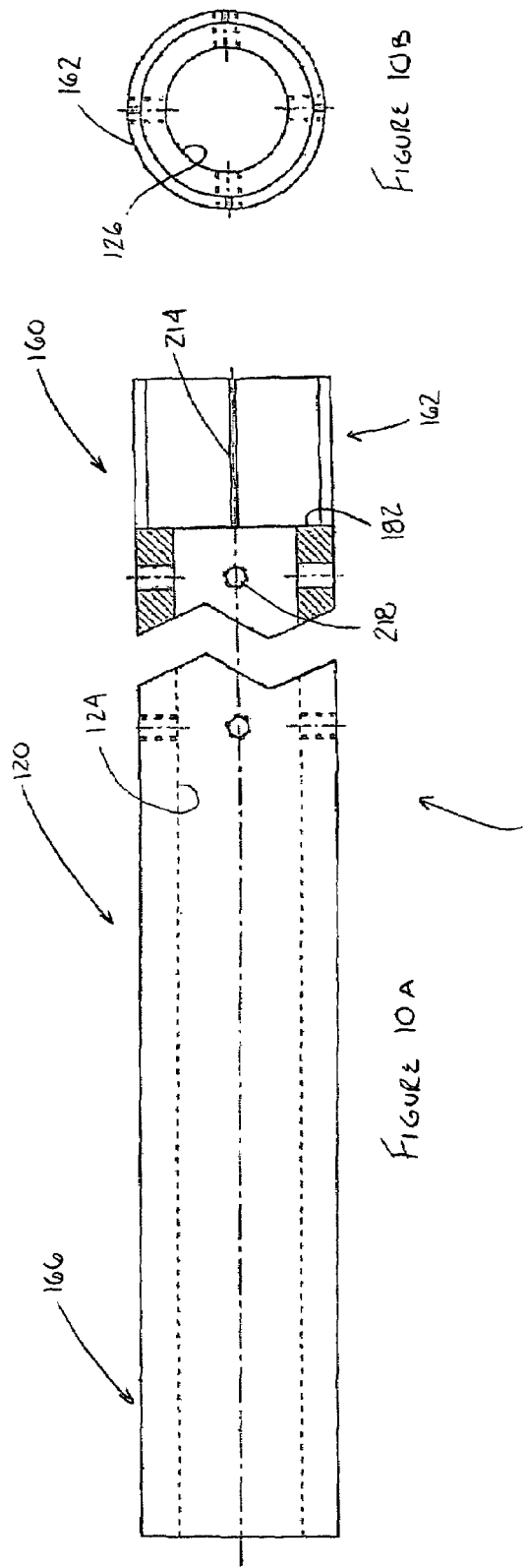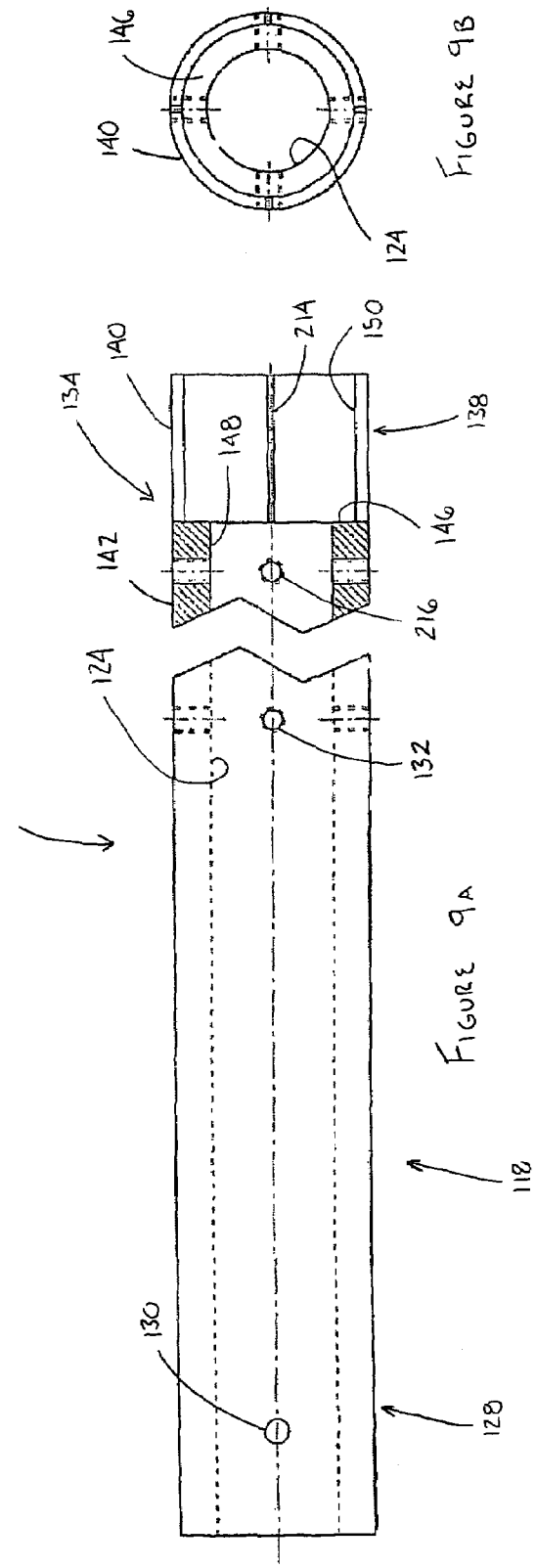

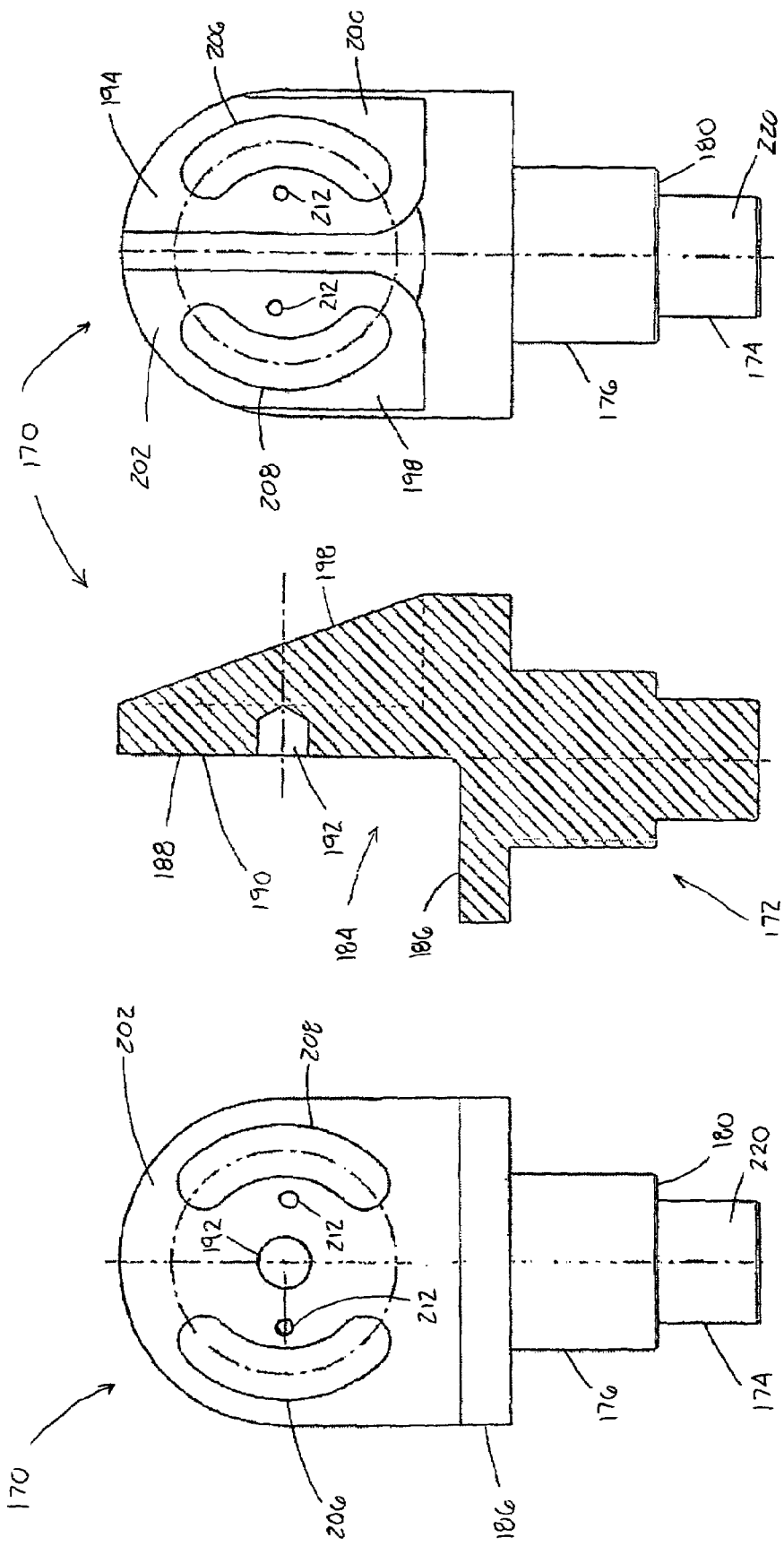

MAGNETIC MOUNTING SYSTEM

CROSS REFERENCE TO RELATED APPLICATIONS

This application claims the benefit of and priority to U.S. Provisional Patent Application Ser. No. 60/598,654, filed Aug. 4, 2004, which application is incorporated herein in its entirety by reference.

BACKGROUND OF THE INVENTION

The present disclosure relates to mounting systems, and more particularly, to magnetic mounting systems. It finds particular application in conjunction with the mounting of antennas and various types of electronic equipment to various types of structures and/or surfaces, and will be described with particular reference thereto. However, it is to be appreciated that the present disclosure is also amenable to other like applications.

In this regard, magnetic mounting systems are well known and are readily utilized by Amateur Radio operators for mounting antennas onto moving vehicles and commercial transportation companies for securing global positioning systems (GPS) and other communication equipment onto trucks. Many of these magnetic mounting systems consist of a base having a plurality of magnets rigidly bolted to an underside of the base. A mast can be rigidly secured to the base for mounting an antenna. These mounts were designed for generally flat surfaces.

With the advent of wireless communication and the increase of cellular phone users, wireless communication providers were required to procure land for additional antenna towers. However, existing zoning ordinances generally required wireless communication providers to seek alternatives to land antenna towers. As such, conventional magnetic mounting systems were considered for mounting wireless communication antennas and associated electronic equipment to existing structures, such as a building's HVAC unit/duct work and water towers. However, conventional magnetic mounting systems are typically unable to hold a supported load in a 140-MPH wind. In addition, because the magnets of the conventional magnetic mounting systems are generally rigidly secured to the base, only a small portion of each magnet's potential holding power is utilized when mounted onto a convex surface such as a water tower. One who has experimented with conventional magnetic mounting systems will be aware of still further deficiencies and difficulties that one must confront in utilizing such devices.

In light of the foregoing, it becomes evident that there is a need for a magnetic mounting system that would provide a solution to one or more of the deficiencies from which the prior art and/or conventional magnetic mounting systems have suffered. It is still more clear that a magnetic mounting system providing a solution to each of the needs left by the prior art while providing a number of heretofore unrealized advantages thereover would represent an advance in the art. Accordingly, it would be desirable to develop a magnetic mounting system which could support a load in a 140-MPH wind and could be secured to a convex surface.

BRIEF DESCRIPTION OF THE INVENTION

In accordance with one aspect of the present disclosure, a magnetic mounting system is provided. The mounting system comprises a base and a first magnet suspended from the base for mounting the base onto a surface.

In accordance with another aspect of the present disclosure, a magnetic mounting system comprises a plurality of magnets and a base. The base includes a plurality of spaced apart mounting apertures. A suspension assembly pivotally secures each magnet of the plurality of magnets to the base. The plurality of mounting apertures of the base allow for varying magnetic arrangements of the plurality of magnets thereby allowing the magnet mounting system to be mounted onto a convex surface.

In accordance with yet another aspect of the present disclosure, a magnetic mounting system for an antenna comprises a base and at least one magnet pivotally secured to the base. The at least one magnet is adapted to at least partially mount the base to a surface. A mast extends from the base and is adapted to receive and secure a portion of the antenna.

Still other aspects of the invention will become apparent from a reading and understanding of the detailed description of the several embodiments hereinbelow.

BRIEF DESCRIPTION OF THE DRAWINGS

The present invention may take physical form in certain parts and arrangements of parts, several embodiments of which will be described in detail in this specification and illustrated in the accompanying drawings which form a part of the invention.

FIG. 4 is an enlarged side elevational view of the suspension assembly of FIG. 3 illustrating a magnet in a second position.

FIG. 5A is a side elevational view of one embodiment of a mast of the magnet mounting system of FIG. 1.

FIG. 5B is a bottom plan view of the mast of FIG. 5A.

FIG. 9A is a side elevational view of a first section of an alternate embodiment of a mast of the magnet mounting system of FIG. 1.

FIG. 9B is a top plan view of the first section of the mast of FIG. 9A.

FIG. 10A is a side elevational view of a second section of the alternate embodiment of the mast of the magnet mounting system of FIG. 1.

FIG. 10B is a bottom plan view of the first section of the mast of FIG. 10A.

FIG. 11 is a front elevational view of an elbow for the alternate embodiment of the mast.

FIG. 12 is a right side elevational view of the elbow of FIG. 11.

FIG. 13 is a left side elevational view of the elbow of FIG. 11.

DETAILED DESCRIPTION OF THE PREFERRED EMBODIMENTS

It should, of course, be understood that the description and drawings herein are merely illustrative and that various modifications and changes can be made in the structures disclosed without departing from the scope and spirit of the invention. Like numerals refer to like parts throughout the several views.

While the present disclosure of a magnetic mounting system is illustrated as being particularly applicable to the mounting of antennas and various types of electronic equipment to various types of structures and/or surfaces, it should be appreciated that the present invention can be adapted for a wide variety of other types of equipment as well as a wide variety of other uses.

Figure 1:
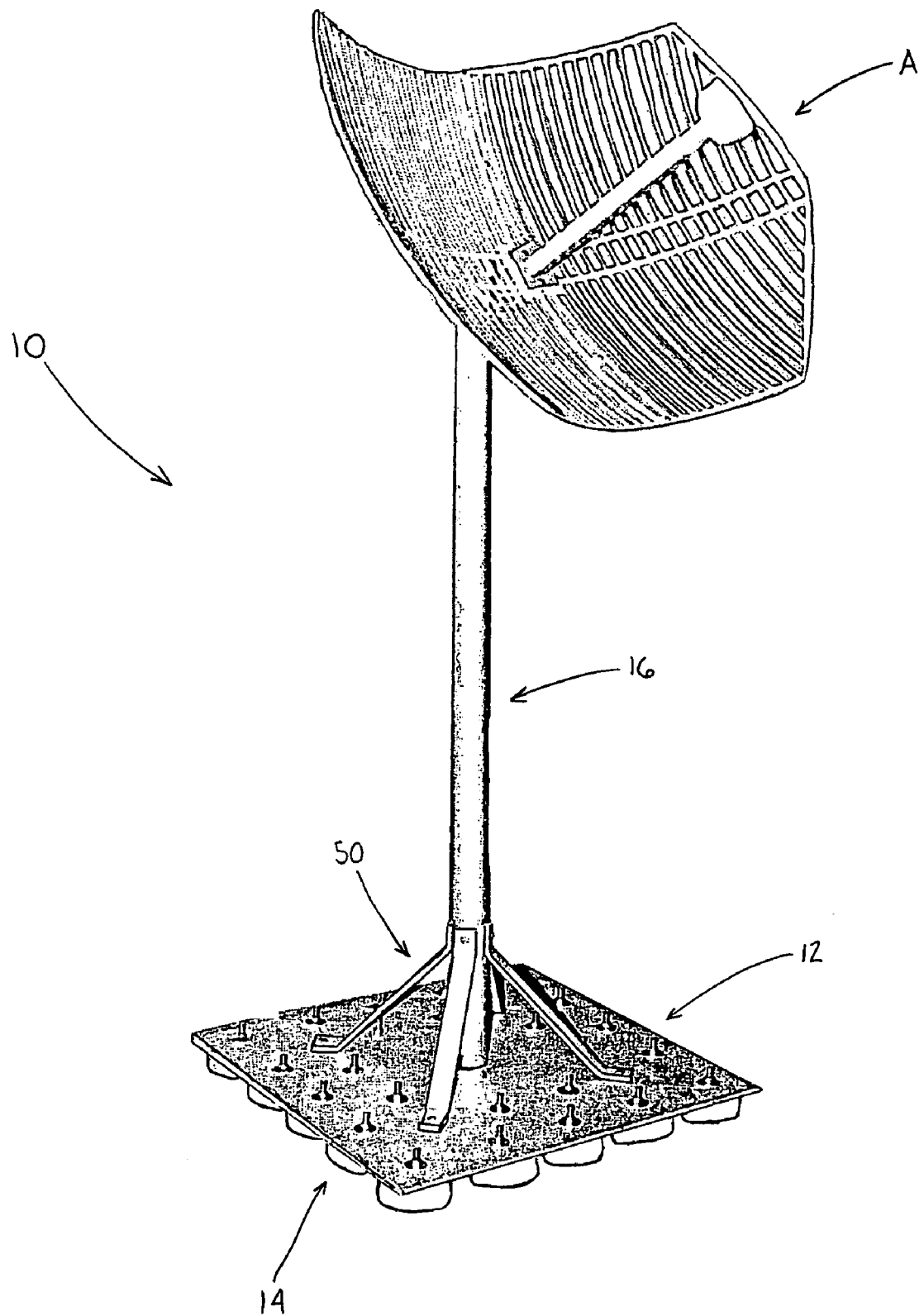
FIG. 1 is a front perspective view illustrating an antenna mounted to a magnet mounting system in accordance with an embodiment of the present invention.

Referring now to the drawings, wherein the drawings illustrate an embodiment of the present invention only and are not intended to limit same, FIG. 1 shows a magnetic mounting system 10 which is designed to mount various types of structures onto flat surfaces, curved surfaces and/or other shaped surfaces. The magnetic mounting system generally comprises a base 12 and at least one magnet 14 suspended from the base for mounting the base to a surface. In this embodiment, a plurality of magnets are suspended from the base. In one form, a mast 16 according to one embodiment of the present invention extends from the base 12 to support a structure such as an antenna A or other type of electrical equipment.

The magnets 14 are generally circular in cross-section; however, it will be appreciated that many other shapes may be used. It will also be appreciated that many types of materials can be used to form the magnets. It will also be understood that many color arrangements can be used for the magnets to obtain a desired look and function of the magnetic mounting system 10 for a particular application.

Figure 2:
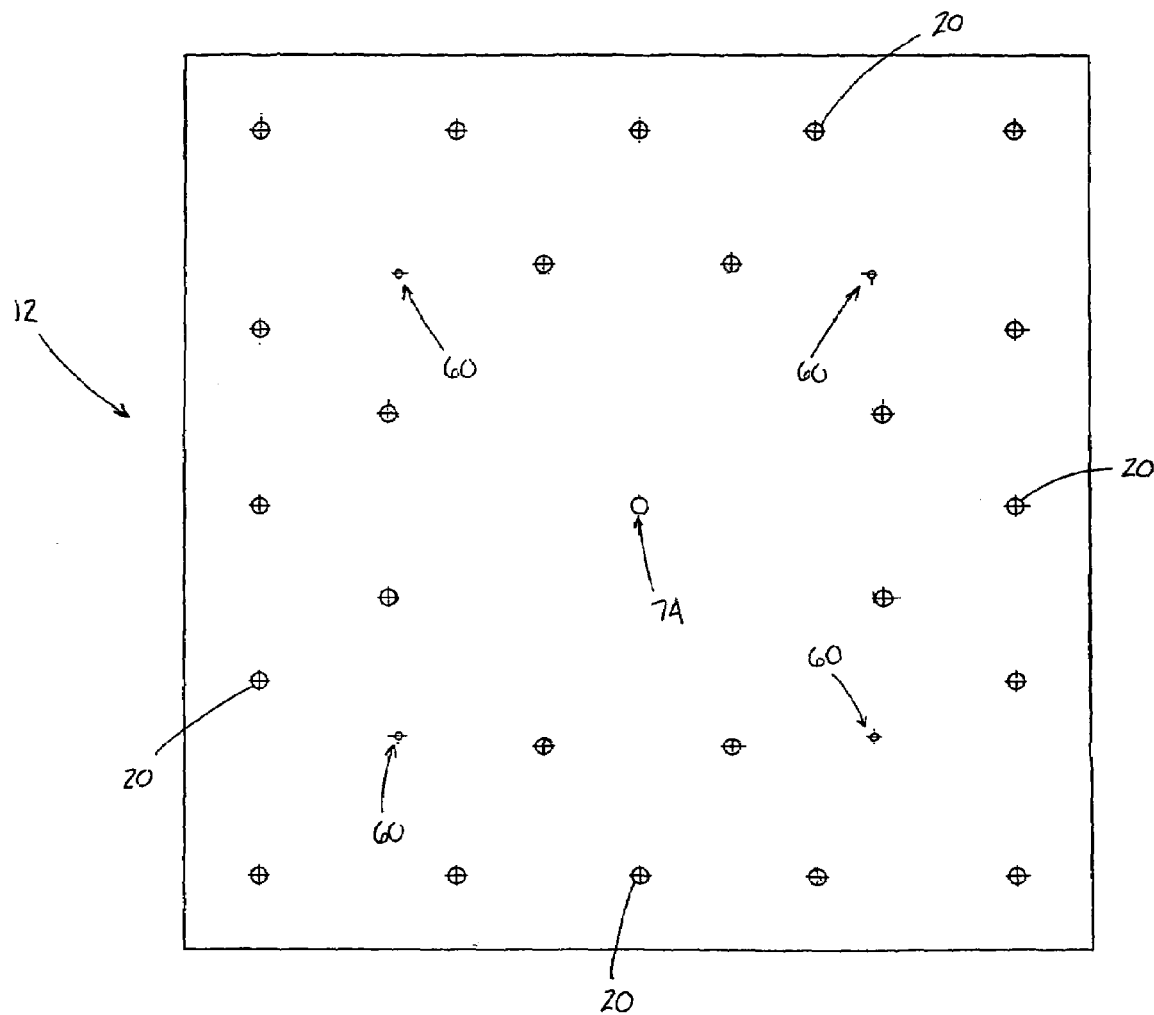
FIG. 2A is a top plan view of a base of the magnet mounting system of FIG. 1.
FIG. 2B is a side elevational view of the base of FIG. 2A.
Figure 3:
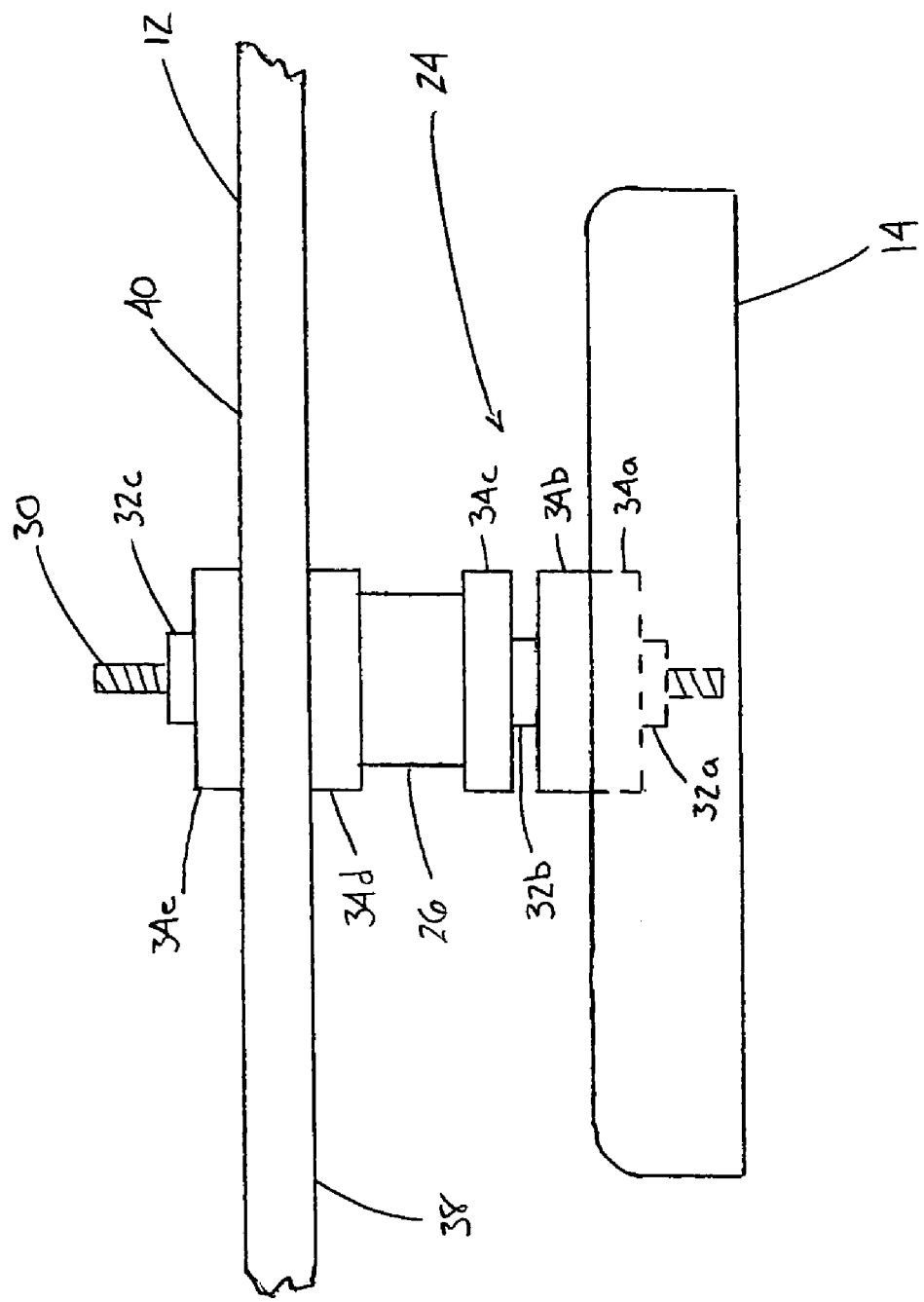
FIG. 3 is an enlarged side elevational view of a suspension assembly of the magnet mounting system of FIG. 1 illustrating a magnet in a first position.

With reference to FIGS. 2A and 2B, the base 12 includes a plurality of spaced apart mounting apertures 20, so that one or more components can be attached thereto. The mounting apertures are adapted to receive a portion of a suspension assembly 24 (FIGS. 3 and 4). The mounting apertures 20 provide a plurality of magnetic arrangements for the magnets 14. It will be appreciated that the number of magnetic arrangements secured to the base 12 will be dependent upon a particular application for the magnetic mounting system 10. The base is illustrated as being a generally rectangular structure; however, it will be understood that other shapes can be used without departing from the scope and intent of the present invention depending on the structure being mounted thereto and the number of magnets being suspended therefrom.

As set forth above, because many of the mounting locations for the magnetic mounting system 10 could have a convex surface (e.g. water towers), the plurality of magnets 14 are moveable relative to the base 12. Again, if the magnets were held inflexibly to the base, only a small portion of the magnet's potential holding power would be utilized. Therefore, as illustrated in FIG. 4, the suspension assembly 24 moveably secures each magnet 14 of the plurality of magnets to the base 12 allowing each magnet to seat itself to whatever orientation it encounters.

With reference now to FIGS. 3 and 4, the suspension assembly 24 includes at least one elastomeric member 26 disposed between the base 12 and the magnet 14. The elastomeric member allows the magnet to pivot relative to the base. Thus, the suspension assembly 24 provides for some movement of the magnet relative to the base to facilitate in the connection of the magnet to a variety of surfaces. The suspension assembly 24 generally includes a stainless steel bolt 30, one or more stainless steel locking nuts 32 and one or more stainless steel washers or plates 34.

With continued reference to FIG. 3, to mount the suspension assembly 24 to the base 12 and the magnet 14, the magnet can be first secured to the bolt. In this regard, a portion of the bolt 30 is extended through an opening (not shown) located on the magnet. A pair of washers 34a, 34b are slid onto the bolt 30 from opposing surfaces of the magnet. A pair of locking nuts 32a, 32b are threaded onto the bolt from opposing ends of the bolt, each nut engaging one of the washers which fixedly secures the magnet between the washers 34a, 34b. Washer 34c is then slid onto the bolt, washer 34c abutting nut 32b. The elastomeric member 26, which can include a neoprene material such as at least one neoprene washer, is then mounted onto the bolt followed by another washer 34d. This subassembly is then secured to a first surface 38 of the base 12. Specifically, a portion of the bolt 30 is extended through one of the mounting apertures 20 of the base 12. The mounting apertures 20 are generally larger than the outer diameter of the bolt 30 which allows the bolt to shift or move in the aperture as the magnet 14 pivots relative to the base 12. Washer 34e is slid onto the bolt 30 from a second surface 40 of the base 12, the base essentially being sandwiched between washers 34d and 34e. Locking nut 32c is then threaded onto the bolt and engages washer 34e.

It should be appreciated that the amount of movement of the magnet 14 relative to the base 12 can also depend on the compression rate of the elastomeric member 26 which, in turn, can depend on the spacing between the base and the magnet. As such, it will be understood that the farther the locking nut 32c is threaded onto the bolt, the more the elastomeric member becomes compressed between washers 34c and 34d. As the elastomeric member becomes compressed, the compression rate of the elastomeric member will increase thereby limiting the pivotal movement of the magnet 14. Thus, the suspension assembly 24 allows the user of the magnetic mounting system 10 to control the pivotal movement of each magnet depending on the type of surface the magnetic mounting system is to be mounted onto.

FIGS. 3 and 4 illustrate a certain arrangement for the components of the suspension assembly 24 to moveably mount the elastomeric member 26 between the base 12 and the magnet 14; however, this arrangement is not limiting and may include a modified or different arrangement and more or fewer components. For example, the opening of the magnet can have a diameter smaller than the locking nuts 32. In this embodiment, washers 34a and 34b may be eliminated. In addition the elastomeric member 26 can be bonded to one of the base, magnet and washer. In this embodiment, the number of washers and locking nuts may be reduced. It will be also appreciated that other and/or additional materials can be used for the suspension system.

With reference now to FIGS. 5A and 5B, the mast 16, which, in one form, extends from the base 12 to support a structure such as the antenna A, is illustrated as being generally cylindrical in cross-section. However, it is to be appreciated that other conformation can be used, such as rectangular. The mast 16 includes a through bore 44 which reduces the overall weight of the mast and allows for easy installation and mounting of structures to the mast. A first end portion 46 of the mast includes a weep hole 48 which allows any water trapped in to bore 44 to escape.

Figure 6A:
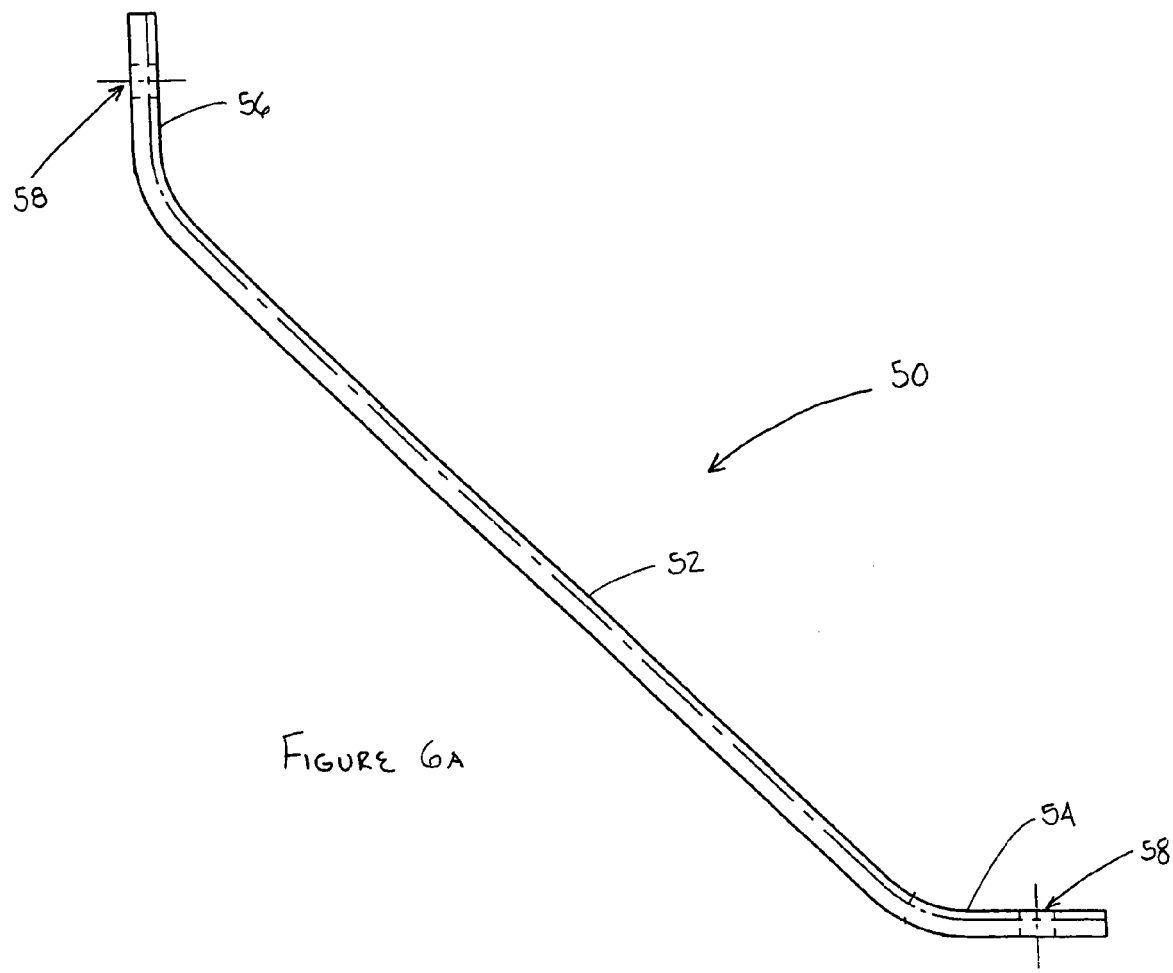
FIG. 6A is a side elevational view of a brace of the magnet mounting system of FIG. 1.
Figure 6B:
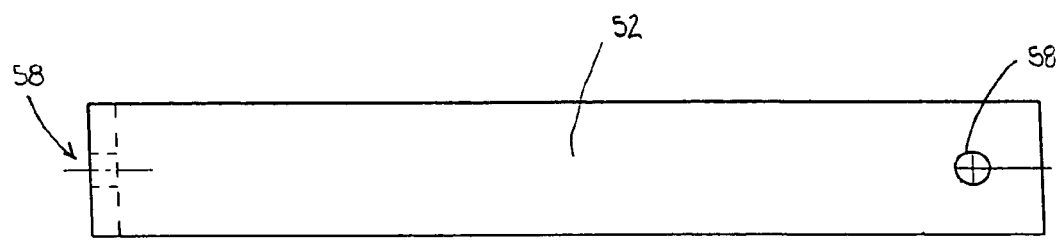
FIG. 6B is a bottom plan view of the brace of FIG. 6A.

With reference again to FIG. 1, in this embodiment, the mast 16 is mounted to the center the base 12 by at least one brace 50. Although four braces are illustrated, more or less braces may be used depending on the type of structure being mounted to the mast. The braces 50 are used in combination with the base 12 and the mast 16 to rigidly secure the mast onto the base. As illustrated in FIGS. 6A and 6B, the brace 50 includes a generally planar central structure 52 and first and second flared flanges 54 and 56, respectively, extending outwardly from opposing end portions of the central structure 52. However, it is to be appreciated that other designs of the central structure and flanges can be used. To mount the braces 50 to the base 12 and the mast 16, each flange includes an aperture 58 dimensioned to receive a conventional fastener. The apertures 58 align with apertures 60 located on the base 12 (FIG. 2A) and apertures 62 located adjacent the first end portion 46 of the mast 16 (FIG. 5A). The apertures 60 and 62 are threaded so that a conventional fastener, such as a screw, extends through one of the apertures 58 and threadedly engages one of the apertures 60 and 62.

Figure 7A:
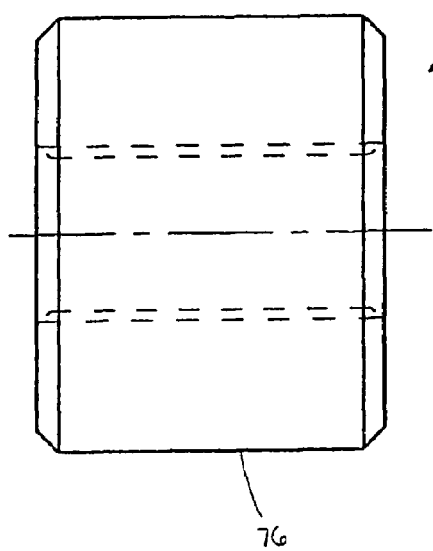
FIG. 7A is a side elevational view of a plug of the magnet mounting system of FIG. 1.
Figure 7B:
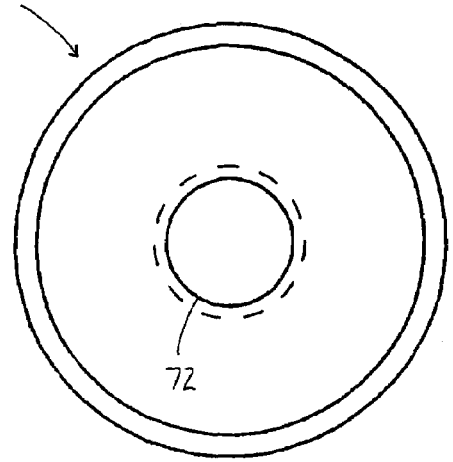
FIG. 7B is a top plan view of the plug of FIG. 7A.

It should be appreciated that the mast 16 may be mounted to the base 12 in other and/or additional manners. Moreover, a plug 70, as illustrated in FIGS. 7A and 7B, can be secured to the base 12 to further prevent the mast 16 from moving in high winds off of dead center of the base. The plug 70 includes an opening 72 which registers with an opening 74 (FIG. 2A) located on the base 12. In this embodiment, the opening 74 extends through the center of the base; although, it will be understood that the opening 74 can be located elsewhere on the base without departing from the scope and intent of the present invention. To mount the plug 70 to the base 12, the plug is positioned on the base so that opening 72 aligns with opening 74. At least one of the openings 72, 74 can be threaded so that a conventional fastener, such as a screw, can extend through the opening 74 from the first surface 38 of the base and threadedly engage the opening 72. The mast 16 is then mounted over the plug 70. More particularly, the plug 70 has an outer diameter slightly smaller than the diameter of the bore 44 of the mast 16. The mast 16 is inserted about the plug, an outer surface 76 of the plug being spaced from the bore. Again, it will be appreciated that the braces 50 can be use without the plug 70 to rigidly securing the mast to the base.

Figure 8A:
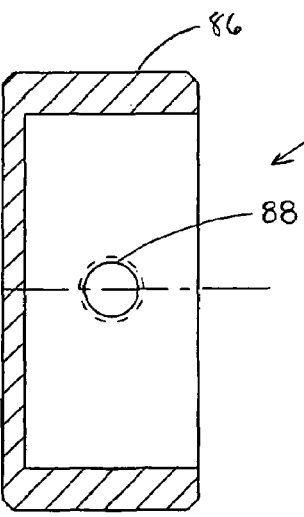
FIG. 8A is a side cross-sectional view of a cap of the magnet mounting system of FIG. 1.
Figure 8B:
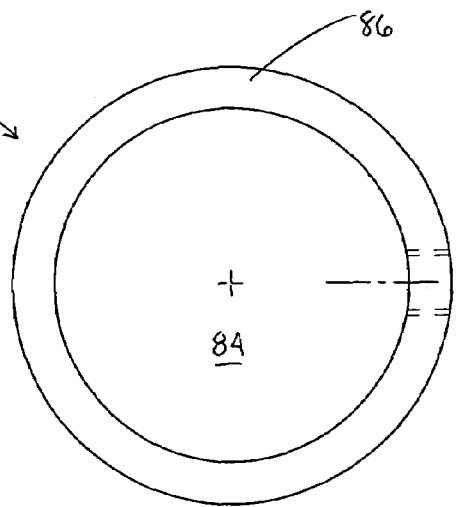
FIG. 8B is a top plan view of the cap of FIG. 8A.

With reference now to FIGS. 8A and 8B, a cap 80 can be used to cover a second end portion 82 of the mast 16 to prevent water and debris from entering into the bore 44 of the mast. The cap includes a top wall 84 and a flange 86 extending outwardly from the top wall. An inner diameter of the flange is slightly larger than the outer diameter of the mast 16 such that second end of the mast can be covered by the flange. The flange includes a threaded opening 88 for receiving a conventional fastener, such as a bolt. As the fastener is being threaded through the opening, an end of the fastener will engage an outer surface 90 of the mast 16 securing the cap 80 to the mast.

Because most of the mounting locations for the magnetic mounting system 10 will not be in a proper direction for aiming the antenna A or other electrical equipment, an alternate embodiment of a mast 116 is illustrated in FIGS. 9A-10B. The mast 116 is generally cylindrical in cross-section and includes a first section 118 pivotally connected to a second section 120. Each section includes a through bore 124 and 126 which reduces the overall weight of the mast and allows for easy installation and mounting of structures to the mast.

As shown in FIGS. 9A and 9B and similar to mast 16, a first end portion 128 of the first section 118 includes a weep hole 130 which allows any water trapped in to bore 124 to escape and threaded apertures 132 for mounting the braces 50 to the mast 116. A second end portion 134 of the first section 118 includes an axially extending flange 138. The flange 138 has an inner diameter larger than the diameter of the bore 124 and an outer surface 140 contiguous with an outer surface 142 of the first section 118 thus forming a radial shelf 146 between a wall 148 of the bore and an inner wall 150 of the flange.

With reference to FIGS. 10A and 10B, a first end portion 160 of the second section 120 also includes a radially extending flange 162 similar to the radial flange 138 described above. A second end portion 166 of the second section 120 can be covered by the cap 80 to prevent water and debris from entering into the bore 126.

With reference now to FIGS. 11-13, the first and second sections 118, 120 of the mast 116 are pivotally connected by a pair of adjustable hinges or elbows 170. The elbow includes a shank 172 having a first section 174 and a second section 176. The first section 174 has an outer diameter slightly smaller than the diameter of each bore 124, 126. The second section 174 has an outer diameter slightly smaller than the inner diameter of each flange 138, 162. Thus, the shank 172 can be slidingly received in each section 118, 120 of the mast 116. Once positioned, a wall 180 of the shank 172 will abut each radial shelf 146 and 182 of the respective first and second sections 118, 120.

The elbow 170 further includes a generally T-shaped plate 184 attached to the shank 172. The plate 184 includes a first section 186 and a second section 188 extending generally normal from the first section. The second section 188 of the plate 184 includes a first wall 190 offset from a center axis of the shank, the first wall having an aperture 192 dimensioned to receive a conventional dowel pin or pivot pin (not shown). Extending from a second wall 194 of the second section 188 is a pair of reinforcing members or gussets 198, 200 which provide additional stability against deflecting forces and maintains the generally perpendicular relationship between the plate 184 and the shank 172. As shown in FIGS. 12 and 13, an end 202 of the second section 188 has a generally arcuate contour.

With continued reference to FIGS. 12 and 13, the second section 188 of the plate 184 includes a pair of opposing arcuate slots 206 and 208. As will be described in greater detail below, the arcuate slots allow the pair of elbows to be rotatably mounted to each other. The arcuate slots are dimensioned to receive conventional fastening means such as a bolt.

To assemble the first section 118 of the mast 116 to the second section 120 of the mast 116, the pair of elbows 170 are first rotatably mounted to each other. An end of the dowel pin (not shown) is inserted in the aperture 192 of the first elbow and an opposing end of the dowel pin is inserted in the aperture 192 of the second elbow. The first elbow 170 is then positioned in the second end portion 134 of the first section 118 and the second elbow 170 is positioned in the first end portion 160 of the second section 120. Conventional bolts are then slid through the arcuate slots 206 and 208. The elbows 170 will allow a structure, such as the antenna A, mounted to the second section 120 of the mast 116 to be aimed at a target anywhere in the X, Y, and Z directions above a plane of the base 12. Once the antenna is properly positioned, the elbows are fixed to each other by threading nuts onto the bolts extending through the arcuate slots and threading conventional set screws (not shown) through openings 212 extending through the second section 188 adjacent the arcuate slots 206 and 208. To assist in the fixing of the elbows 170, each flange 138, 162 can include a slot 214 (FIGS. 9A, 10A) dimensioned for an adjustable clamp (not shown) which can hold the position of the elbows prior to insertion of the set screws. The elbows 170 are also fixed to the end portions 134, 160 by threading a conventional fastener, such as a screw or bolt, into respective threaded openings 216 and 218 located on the end portions 134, 160 (FIGS. 9A, 10A). As the fastener is being threaded through the openings, an end of the fastener will engage an outer surface 220 of the second section 174 of the shank 172 securing the elbows 170 to the mast 116.

The base, mast, braces, plug and cap are preferably aluminum, but is should be noted that other metals, such as stainless steel, composites or hard materials may be used. Likewise, the conformation of the mast may relate to any shape other than the generally cylindrical shape, such as rectangular, square, triangular, or any other shape depending on the size and requirements needed for the end use of the magnetic mounting system. It should be appreciated that the shape of the plug, the cap and the shank of the elbow is dependent on the conformation of the mast. Similarly, the mast is shown as being located at or near the center point of the base, although that could be varied. Likewise, although it is preferred to use 300 grade stainless steel components (bolt, nut and washer) for the suspension assembly, occasionally other materials of construction may be used without departing from the scope and intent of the invention.

The present invention provides a magnetic mounting system wherein the mounting force of the magnets can hold a supported load in a 140-MPH wind by taking advantage of the lever principals of larger platforms regardless of the type of surface the magnetic mounting system is mounted onto (e.g. onto flat surfaces, curved surfaces and/or other shaped surfaces). In addition, because the magnets of the magnetic mounting systems are moveably secured to the base, a large portion of each magnet's potential holding power is utilized when mounted onto a convex surface such as a water tower.

The present disclosure has been described with reference to the illustrated embodiment. Obviously, modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A magnetic mounting system comprising:
a base; and
a mast extending from the base;
a first magnet and a second magnet suspended from the base for mounting the base onto an associated surface,
wherein the base includes a plurality of spaced apart mounting apertures, the plurality of mounting apertures of the base providing a plurality of magnetic arrangements for the first and second magnets.

2. The invention of claim 1 further comprising a suspension assembly connected to each of the first magnet and second magnet for moveably securing each of the first magnet and second magnet to the base.

3. The invention of claim 2 wherein the suspension assembly includes at least one elastomeric member disposed between each of the first magnet and second magnet and the base.

4. The invention of claim 3 wherein the at least one elastomeric member includes a Neoprene material.

5. The invention of claim 2 wherein the suspension assembly further includes at least one bolt, at least one locking nut and at least one washer.

6. The invention of claim 2 wherein each aperture of the base is adapted to receive a portion of the suspension assembly to suspend one of the first magnet and second magnets from the base.

7. The invention of claim 1 wherein the mast includes an adjustable elbow, the elbow allowing a section of the mast to move relative to the base.

8. The invention of claim 1 further comprising a brace rigidly securing the mast to the base.

9. The invention of claim 8 wherein the brace includes a generally planar section and first and second flared flanges extending from opposing end portions of the planar section, the first and second flanges being secured to one of the base and the mast.

10. The invention of claim 1 further comprising a plug, the plug being secured to the base and received by a portion of the mast.

11. The invention of claim 1, wherein at least a portion of the first magnet hangs below a bottommost surface of the base.

12. A magnetic mounting system comprising:
a plurality of magnets;
a base including a plurality of spaced apart mounting apertures; and
a suspension assembly pivotally securing and suspending each magnet of the plurality of magnets to the base,
wherein the plurality of mounting apertures of the base allow for varying magnetic arrangements of the plurality of magnets thereby allowing the magnet mounting system to be mounted onto an associated convex surface.

13. The invention of claim 12 further comprising a mast secured to the base.

14. The invention of claim 12 wherein the mast includes a first section hingedly secured to a second section.

15. The invention of claim 12 wherein the suspension assembly includes at least one elastomeric member disposed between the base and each magnet.

16. A magnetic mounting system for an associated antenna comprising:
a base;
at least one magnet pivotally secured to and spaced from a bottommost surface of the base and adapted to at least partially mount the base to an associated surface; and
a mast extending from the base and adapted to receive and secure a portion of the associated antenna.

17. The invention of claim 16 further comprising a suspension assembly for suspending the at least one magnet from the base, the suspension assembly including at least one elastomeric member secured to the base and the at least one magnet.

18. The invention of claim 16 wherein the mast includes a first section hingedly secured to a second section.

\* \* \* \* \*